March 1, 1949.    J. C. SPINDLER    2,462,916

PHASE MEASURING DEVICE

Filed March 25, 1944

INVENTOR
JOSEPH C. SPINDLER
BY
ATTORNEY

Patented Mar. 1, 1949

2,462,916

UNITED STATES PATENT OFFICE 2,462,916

PHASE MEASURING DEVICE

Joseph C. Spindler, Brooklyn, N. Y., assignor to Federal Telephone and Radio Corporation, New York, N. Y., a corporation of Delaware Application March 25, 1944, Serial No. 528,147

8 Claims. (Cl. 172—245)

This invention relates to phase measurements and to phase measuring devices for measuring the difference in phase angle between two alternating voltages or between one alternating voltage and a reference voltage.

An object of the invention is to provide a simple device and a method for measuring the difference in phase angle between two alternating voltages.

Another object of the invention is to provide a device and a method for measuring the difference in phase angle between two alternating voltages in which the angle can be read directly on a meter.

Still another object of the invention is to provide a phase measuring device utilizing a goniometer.

Other objects and objects relating to the arrangement and electrical connections of the various parts of the device will be apparent as the description of the invention proceeds.

The invention is illustrated in the accompanying drawings, in which.

The device of the invention is based upon the principle that if two alternating voltages are applied to the two stators of a goniometer, the voltage induced in the rotor of the goniometer is a function of the magnitudes of the voltages in the stators, the phase angle $\phi$, and the angular position $\theta$ of the rotor. By detecting the voltage induced in the rotor of the goniometer and measuring the output for different positions of the rotor and adjusting the magnitude of the output for a certain position of the rotor, it is possible to read the phase angle between the two voltages directly upon the output meter when the rotor of the goniometer is turned to another position.

Figure 1:
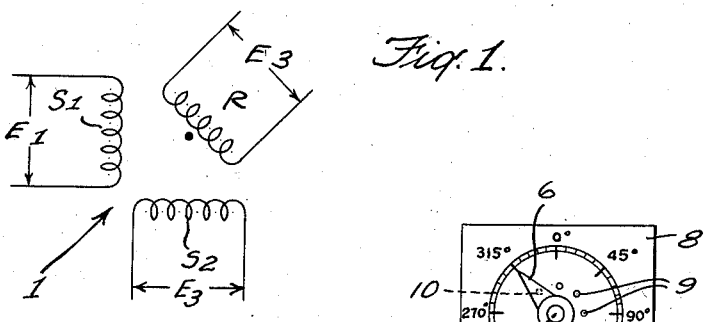
Fig. 1 is a diagrammatic representation of a goniometer used to explain the invention.

Referring to Fig. 1, a goniometer 1 is indicated diagrammatically with stator coils S1 and S2 arranged in the usual manner at right angles to each other and a rotor coil R arranged to rotate in the plane of the stator coils. Assume that one alternating voltage is applied to the stator coil S1 and has a value $E_1$, and that the second alternating voltage is applied to the stator coil S2 and has a value $E_2$. Then the voltage induced in the rotor coil R has a value $E_3$. Assume also that the position of the rotor for inducing a maximum voltage from the stator coil S1 is called 0°. We can then say:

$$|E_3| = f(|E_1|, |E_2|, \phi, \theta)$$

If the $|E_1| = |E_2|$, then the function describing the relative variation in $|E_3|$ is $$|\Delta E_3| = f_1(\phi, \theta) \text{ or } \phi = f_2(\theta, |\Delta E_3|)$$

As will be shown, the factors $\theta$ and $|\Delta E_3|$ can be expressed in terms of a single variable $$\left|\frac{E_3 \min}{E_3 \max}\right|$$

where $E_3$ max is the maximum output obtained as the rotor of the goniometer is turned and $E_3$ min is the minimum output as the rotor is turned. These maximum and minimum output voltages are obtained because the relative polarity between the rotor and stator coils changes as the rotor is turned. In one position of maximum coupling the voltages add in the rotor and in the other position they subtract.

Then $$\phi = f_3\left(\left|\frac{E_3 \min}{E_3 \max}\right|\right)$$

That is, it can be shown that under certain conditions the phase angle $\phi$ can be determined from the ratio of minimum rotor output to maximum rotor output as the rotor is turned through an angle large enough to determine these two values.

If we first consider the case where $|E_1| = |E_2| = a$ constant, and $\phi = 0°$, then $$|E_3| = KE_1 \cos \theta + KE_2 \cos (90° - \theta)$$

or, since $E_1 = E_2$, $$|E_3| = k[\cos \theta + \cos (90° - \theta)]$$

where $k = KE_1$.

It can then be shown that, because of the difference in relative coil polarity for different positions of the rotor, $|E_3|$ will be a maximum at a position $\theta$ which is an odd multiple of 45° and a minimum at a position also an odd multiple of 45° but 90° removed from that giving the maximum value. Hence;

$$|E_3| \max = |k(\pm A \pm B)|$$

and $$|E_3| \min = |k(\pm A \mp B)|$$

where A is the component derived from $E_1$ and is equal to $$\frac{1}{\sqrt{2}}$$

and B is the component derived from $E_2$ and is equal to $$\frac{1}{\sqrt{2}}$$

Therefore the $$|E_3 \max| = \left|k\left(\pm\frac{1}{\sqrt{2}}\pm\frac{1}{\sqrt{2}}\right)\right|$$

and $$|E_3 \min| = \left|k\left(\pm\frac{1}{\sqrt{2}}\mp\frac{1}{\sqrt{2}}\right)\right|$$

If now we consider the effects of phase angle at these $|E_3 \max|$ and $|E_3 \min|$ positions, it being understood that $\phi$ equals the difference in phase angle between $E_1$ and $E_2$, then $$|E_3 \max| = \left|\sqrt{\left(\pm\frac{k}{\sqrt{2}}\pm\frac{k}{\sqrt{2}}\cos\phi\right)^2 + \left(\pm\frac{k}{\sqrt{2}}\sin\phi\right)^2}\right| = |k\sqrt{1+\cos\phi}|$$

and $$|E_3 \min| = \left|\sqrt{\left(\pm\frac{k}{\sqrt{2}}\mp\frac{k}{\sqrt{2}}\cos\phi\right)^2 + \left(\mp\frac{k}{\sqrt{2}}\sin\phi\right)^2}\right| = |k\sqrt{1-\cos\phi}|$$

or $$\frac{|E_3 \min|}{|E_3 \max|} = \left|\sqrt{\frac{1-\cos\phi}{1+\cos\phi}}\right|$$

Hence, for any value of $\phi$ a definite value of the fraction $$\frac{|E_3 \min|}{|E_3 \max|}$$

will be obtained. Calculations show that for $\phi = 0°$, $$\frac{|E_3 \min|}{|E_3 \max|} = 0; \phi = 45°, \frac{|E_3 \min|}{|E_3 \max|} = 0.415; \phi = 90°, \frac{|E_3 \min|}{|E_3 \max|} = 1$$

Figure 2:
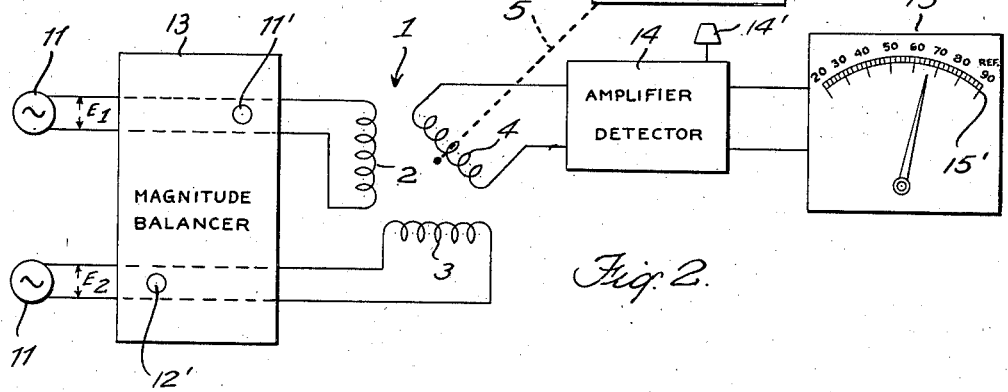
Fig. 2 is a schematic circuit diagram of the phase measuring device of the invention.

In Fig. 2 is shown a schematic circuit diagram of a device for measuring the difference in phase angle between two voltages in accordance with the explanation given above. The goniometer 1 has two stator coils, 2 and 3, corresponding to the stator coils S1 and S2 of Fig. 1 and a rotor coil 4 corresponding to the rotor coil R of Fig. 1. The rotor is mounted upon a suitable shaft indicated by the dotted line 5 upon which is also mounted a pointer 6 and a knob 7 for manually rotating the shaft. The pointer 6 rotates in cooperation with a dial 8 and may be provided with suitable detents 9 which cooperate with a projection 10 on the pointer 6, so that the pointer may be positioned accurately at a desired angle.

The source of one voltage, $E_1$, is indicated at 11 and the source of the other voltage, $E_2$, is indicated at 12. These voltages are fed through a magnitude balancer 13 which is for the purpose of adjusting the amplitude of these voltages as delivered to the stator coils 2 and 3, adjusting knobs 11' and 12' being provided for that purpose. A suitable circuit for this magnitude balancer will be described later.

The output of the rotor coil 4 is delivered to an amplifier and detector 14 which may be any suitable amplifier and detector for alternating current of the frequency being used, the gain of the amplifier being adjusted by means of the control knob 14'. The output of the amplifier and detector 14 is delivered to a direct current meter 15 which may be any current indicating device for measuring the variation in the D. C. component of the detector output, such, for example, as a D. C. microammeter, and which may be calibrated to read the phase angle directly.

The measurement may be made in the following manner: First the rotor 4 of the goniometer 1 is rotated by means of the knob 7 until the pointer registers 0°, at which time the rotor coil will be parallel to the stator coil 2. Voltage will then be induced in the rotor coil 4 from the stator coil 2 and not from the stator coil 3. The detected output voltage is then inspected on the indicating meter 15 and the output adjusted to a convenient value by adjusting the control knob 11' provided on the magnitude balancer 13 for adjusting the amplitude of the voltage $E_1$. The reading on the output meter is noted. Thereupon the rotor coil 4 is rotated until the pointer is aligned with the 90° position when the rotor coil 4 will be parallel to the stator coils 3 and voltage induced in it will be from that coil. The reading on the output meter is again noted. If it is the same as the last reading no further adjustment of the magnitude balancer is necessary, but if it is different, then the control knob 12' of the magnitude balancer 13 for controlling the amplitude of the voltage $E_2$ is adjusted until the reading of the output meter is the same as before. When this is done the two voltages $E_1$ and $E_2$ will be equal in their effect on the rotor 4 of the goniometer 1.

The rotor 4 of the goniometer 1 is then set at either 45° or 135° whichever gives the larger output, and the amplifier and detector 14 is adjusted by means of the knob 14', provided for that purpose, so that the output of the amplifier may be raised or lowered to bring the needle of the indicator meter 15 to a reference line 15' which may conveniently correspond to the 90° indication on the scale. Then the goniometer coil 4 is rotated to the 135° or 45° position, whichever gives the smaller output, whereupon the phase angle $\phi$ between the two input voltages $E_1$ and $E_2$ may be read directly on the scale of the meter which is calibrated for that purpose in accordance with the equation. This reading will always give the correct phase angle, since the maximum output is always adjusted to coincide with the reference mark on the meter.

The reference mark on the meter might be placed so as to be used with the minimum output reading; in which case the minimum output would always be adjusted to it and the maximum output would then give the phase angle.

It is preferable to adjust the input voltages $E_1$ and $E_2$ so that they are equal, but this is not always necessary, since it can be shown that a phase measurement may be read directly on the meter as long as the value $$\frac{E_1}{E_2}$$

is maintained at a definite ratio, or, in other words, where $$\frac{E_1}{E_2}$$

equals a constant. However, the maximum range deflection on the meter is obtained when the two voltages are equal and therefore the most accurate determination of the phase angle can be obtained for this condition.

Figure 3:
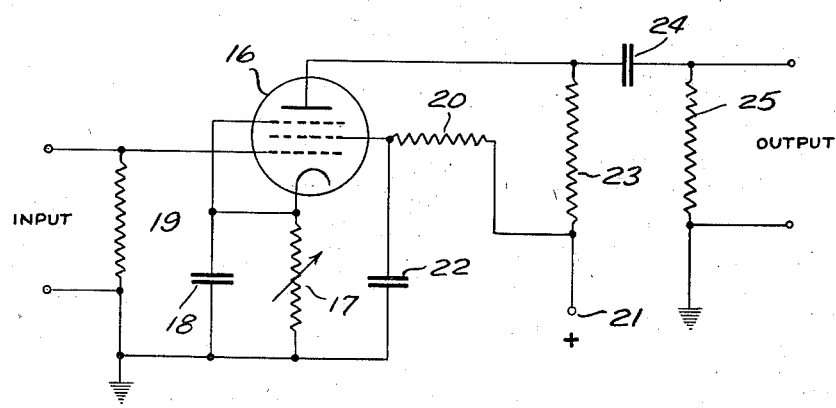
Fig. 3 is a circuit diagram of one form of magnitude balancer used in the device of the invention.

In Fig. 3 is shown a circuit two of which may be used in the magnitude balancer 13 for adjusting the magnitude of the input voltages without changing the phase thereof. In its simplest form the circuit comprises a pentode tube 16 provided with a variable resistor 17 in its cathode circuit which is shunted by a condenser 18. The input voltage is delivered across a resistor 19 which is connected between the control grid and ground. The suppressor grid is connected to the cathode and the screen grid is given a suitable potential through a resistor 20 from a source of positive potential, indicated at 21, the screen grid being bypassed to ground through a condenser 22. The plate of the tube 16 is provided with a suitable positive potential through a resistor 23 from the source of positive potential 21. A coupling condenser 24 applies the voltage variations from the plate of the tube across an output resistor 25 which is connected across the stator coil.

Adjustment of the resistance 17 in the cathode circuit will alter the bias of the tube so as to change the output voltage. It will be understood that the components of the circuit are properly chosen to prevent change of phase in the output circuit when the bias resistor is adjusted. One circuit is provided for the input voltage $E_1$ and another for the input voltage $E_2$, the adjusting knobs 11' and 12' being provided to make the adjustment on the bias resistors. Other circuits for making this balance adjustment may be provided if desired.

With proper selection of components for the two circuits of Fig. 3 used in the magnitude balancer 13 there should be no phase shift in the output voltages with change in setting of the variable resistors in the cathode circuits. However, if there should be any noticeable difference in phase between the two circuits, it is possible to determine what that phase difference is by feeding a single alternating voltage into the two stator coils simultaneously. The procedure outlined above can then be followed to determine the indicator reading, which should be 0°. If it is not 0°, a simple network arrangement for shifting the phase of one balancer circuit with respect to the other may be used to make the reading 0°. Then the entire system should operate properly.

While the invention has been disclosed in connection with a mechanically operated goniometer, other types of goniometers, such as an electronic type, may be used.

From the above description it will be seen that I have provided a method and a means for accurately measuring the difference in phase angle between two alternating voltages, and that by means of my invention this difference in angle may be read directly on a specially calibrated meter.

Various modifications of the invention may be apparent to those skilled in the art and I do not therefore wish to be limited to the specific method and structure disclosed except by the limitations defined in the appended claims.

What is claimed is:

1. The method of determining the difference in phase angle between two alternating voltages of the same frequency which comprises causing said voltages to produce fields of force at an angle to each other, placing a conducting element successively in a plurality of predetermined positions in said fields whereby voltages are induced in said element, measuring the voltages induced in said element in each of said positions, adjusting the two voltages to have a predetermined constant ratio between them, adjusting the voltage induced in said element when in one position to a predetermined reference value, and reading the phase angle between the two input voltages directly on a meter when said element is in another position.

2. The method of determining the difference in phase angle between two alternating voltages of the same frequency which comprises impressing said voltages on the stator coils of a goniometer with a predetermined constant ratio between their amplitudes, detecting the output of the rotor coil of said goniometer, adjusting the angle of said rotor coil to receive maximum induced voltage from both said stator coils, as indicated by the detected output, measuring the detected output of said rotor coil, adjusting the angle of said rotor coil to receive minimum induced voltage from both said stator coils, as indicated by the detected output, again measuring the detected output of said rotor coil, and taking the ratio of the smaller measurement to the larger measurement as a measurement of the difference in phase angle between said two first mentioned voltages.

3. The method of determining the difference in phase angle between two alternating voltages of the same frequency which comprises impressing said voltages on the stator coils of a goniometer with a predetermined constant ratio between their amplitudes, detecting the output of the rotor coil of said goniometer, applying the detected output to a meter, adjusting the angle of said rotor coil to receive maximum induced voltage from both said stator coils, as indicated on said meter, adjusting the angle of said rotor coil to receive minimum induced voltage from both said stator coils, as indicated on said meter, adjusting the magnitude of the detected output in one of said angular positions of said rotor coil so that said meter will register a predetermined reference value, and reading the phase angle between said two first mentioned voltages directly on said meter when said rotor coil is in the other of said angular positions.

4. The method of determining the difference in phase angle between two alternating voltages of the same frequency which comprises impressing said voltages on the stator coils of a goniometer with a predetermined constant ratio between their amplitudes, detecting the output of the rotor coil of said goniometer, applying the detected output to a meter, adjusting the angle of said rotor coil to receive maximum induced voltage from both said stator coils, as indicated on said meter, adjusting the magnitude of the detected output of said rotor coil so that said meter will register a predetermined reference value adjusting the angle of said rotor coil to receive minimum induced voltage from both said stator coils, as indicated by said meter, and reading the phase angle between said two first mentioned voltages directly from said meter.

5. A phase measuring device comprising a goniometer having two galvanically independent stator coils and a rotor coil, means to deliver a first alternating voltage of a given frequency to a first stator coil of said goniometer, means to deliver a second alternating voltage at the same frequency to the second stator coil of said goniometer, means for adjusting the relative voltage of said stator coils to obtain a constant ratio therebetween, a detector having its input connected to said rotor coil, a meter connected to said detector and adapted to measure the detector output, and means to adjust the position of said rotor coil.

6. A phase measuring device comprising a goniometer having two galvanically independent stator coils and a rotor coil, means to deliver a first alternating voltage to a first stator coil of said goniometer, means to deliver a second alternating voltage to the second stator coil of said goniometer, means for adjusting the relative voltage of said stator coils to obtain a constant ratio therebetween, an amplifier, and a detector connected to the output of said rotor coil, means to measure the output of said detector, means to adjust the output of said detector, and means to adjust the position of said rotor coil.

7. A phase measuring device comprising a goniometer having two galvanically independent stator coils and a rotor coil, means to apply a first alternating voltage to a first stator coil of said goniometer, means to adjust the amplitude of the voltage applied to said first stator coil, means to apply a second alternating voltage to the second stator coil of said goniometer, means to adjust the amplitude of the voltage applied to said second stator coil to establish a constant voltage ratio between said stator coils, an amplifier and a detector connected to the output of said rotor coil, means to measure the output of said detector, means to adjust the output of said amplifier, and means to position said rotor coil in any one of a plurality of rotary positions.

8. A phase measuring device comprising a goniometer having two galvanically independent stator coils and a rotor coil, means to apply a first alternating voltage to a first stator coil of said goniometer, means to adjust the amplitude of the voltage applied to said first stator coil, means to apply a second alternating voltage to the second stator coil of said goniometer, means to adjust the amplitude of the voltage applied to said second stator coil, an amplifier connected to the output of said rotor coil, means to adjust the gain of said amplifier, a detector connected to the output of said amplifier, means to adjust said rotor to any one of a plurality of rotary positions, two of which are those which produce maximum and minimum voltage from said stator coils, and a meter connected to the output of said detector, said meter being calibrated in accordance with the equation:

$$\frac{|E_3 \min|}{|E_3 \max|} = \sqrt{\frac{1-\cos\phi}{1+\cos\phi}}$$

where $|E_3 \min|$ is said minimum voltage from said stator coils, and $|E_3 \max|$ is said maximum voltage from said stator coils and $\phi$ equals the difference in phase angle between said first and second alternating voltages, a predetermined value for one of the terms in the left hand side of the equation being used as a reference point for said calibration.

JOSEPH C. SPINDLER.

REFERENCES CITED

The following references are of record in the file of this patent:

UNITED STATES PATENTS

| Number | Name | Date |
| --- | --- | --- |
| 1,365,579 | Appleby et al. | Jan. 11, 1921 |
| 1,435,941 | Robinson | Nov. 21, 1922 |
| 1,717,679 | Goldschmidt et al. | June 18, 1929 |
| 2,202,885 | Zuschlag | June 4, 1940 |
| 2,256,538 | Alford | Sept. 23, 1941 |